United States Patent [19]

Sundseth

[11] Patent Number: 5,297,663
[45] Date of Patent: Mar. 29, 1994

[54] CONVEYOR BALL UNIT

[75] Inventor: Jarl Sundseth, Neuhaus, Fed. Rep. of Germany

[73] Assignee: Electro Pneumatic International GmbH, Fed. Rep. of Germany

[21] Appl. No.: 76,354

[22] Filed: Jun. 14, 1993

Related U.S. Application Data

[62] Division of Ser. No. 882,412, May 13, 1992, Pat. No. 5,219,057.

[30] Foreign Application Priority Data

May 14, 1991 [DE] Fed. Rep. of Germany ....... 4115707

[51] Int. Cl.⁵ ............................................. B65G 13/00
[52] U.S. Cl. ................................ 193/35 MD; 384/49
[58] Field of Search ................ 193/35 MD; 16/24–27; 384/49, 490, 491, 610

[56] References Cited

U.S. PATENT DOCUMENTS

| | | |
|---|---|---|
| 1,963,956 | 6/1934 | Craig . |
| 3,466,697 | 9/1969 | Cain et al. ...................... 193/35 MD |
| 4,696,583 | 9/1987 | Gorges ............................. 193/35 MD |
| 4,778,041 | 10/1988 | Blaurock . |
| 5,033,601 | 7/1991 | Huber . |
| 5,076,412 | 12/1991 | Huber ............................... 193/35 MD |
| 5,096,308 | 3/1992 | Sundseth ........................ 193/35 MD |
| 5,219,057 | 6/1993 | Sundseth ........................ 193/35 MD |

FOREIGN PATENT DOCUMENTS

| | | |
|---|---|---|
| 249648 | 6/1911 | Fed. Rep. of Germany . |
| 3507945 | 10/1986 | Fed. Rep. of Germany . |
| 3541020 | 5/1987 | Fed. Rep. of Germany . |
| 3927560 | 8/1989 | Fed. Rep. of Germany . |
| 8915491 | 8/1990 | Fed. Rep. of Germany . |

*Primary Examiner*—Joseph E. Valenza
*Attorney, Agent, or Firm*—Eckert Seamans Cherin & Mellott

[57] ABSTRACT

A conveyor ball unit comprises a conveyor ball resting on mounting balls in a mounting shell. A retaining ring is provided to hold the conveyor ball on the mounting balls in the mounting shell. The mounting shell can be set into an opening in a supporting structure and rests on the supporting structure by way of a shell rim. The unit is fixed in place by resilient first locking elements comprising in a first embodiment of the invention resiliently deformable projections which also define radial recesses in the interior of the mounting shell into which recesses projections formed on the retaining ring can be inserted in order to fix the ring within the mounting shell.

7 Claims, 5 Drawing Sheets

CONVEYOR BALL UNIT

This is a divisional of U.S. patent application Ser. No. 882,412, filed May 13, 1992 now U.S. Pat. No. 5,219,057.

FIELD OF THE INVENTION

The present invention relates to a conveyor ball unit in which a conveyor ball is mounted on mounting balls within a mounting shell.

DESCRIPTION OF THE PRIOR ART

Conveyor ball units of this kind are widely used to move containers or similar items in the loading areas of freight aircraft. It is evident that apparatus for this purpose must be light but robust. Furthermore, they should be simple in design to minimize their cost, and their installation and replacement should involve no major expenditure of labor.

In U.S. Pat. No. 1,963,956 a conveyor ball unit is described that is fixed to a support by screws so that an elaborate installation procedure is required.

German DE-PS 249 648 discloses a conveyor ball unit that comprises a cast element and hence is very heavy.

A conveyor ball unit is described in German DE 35 07 945 C1 in which the mounting shell is attached to a retaining ring and the retaining ring is attached to an additional ring-shaped holding element. The whole unit is then set into an opening in a supporting structure. This unit is thus elaborate in construction. Another elaborately constructed unit is disclosed in German DE 35 41 020 wherein the conveyor ball unit has a mounting shell contained within a housing. The housing bears hook-shaped elements by which the conveyor ball unit is fixed in a supporting structure.

In German DE 89 15 491 U1 a retaining ring of the conveyor ball unit is attached to a mounting shell by teeth. The mounting shell carries a bolt that must be adjusted at least when the conveyor ball unit is removed from the opening in the supporting structure. This arrangement is thus relatively complicated, both in construction and in operation.

German DE 39 27 560 A1 discloses a conveyor ball unit in which a retaining ring has resilient bolts integral with the ring, which serve both to hold the ring in the mounting shell and to hold the whole conveyor ball unit in the supporting structure. To remove this conveyor ball unit from the supporting structure is a relatively complicated procedure requiring some dexterity. Furthermore, as the retaining ring is retained relatively elastically in the mounting shell, when it is in use the conveyor ball can move appreciably with respect to the mounting shell, so that the arrangement is subject to greater wear. Additionally, this unit is relatively complicated in structure.

SUMMARY OF THE INVENTION

The present invention is directed to the problem of developing a conveyor ball unit of the type described at the outset in such a way that, while remaining simple in structure, it is more resistant to wear and at the same time can be more easily installed and removed than conventional units.

According to a first aspect of the present invention there is provided a conveyor ball unit comprising a conveyor ball; a mounting shell for the conveyor ball; a plurality of mounting balls for supporting the conveyor ball in the mounting shell; a retaining ring to keep the conveyor ball in position on the mounting balls within the mounting shell; a resilient first locking element for the attachment of the mounting shell to a supporting structure and for bracing a rim of the mounting shell against the supporting structure, the first locking element being formed by at least one resiliently deformable projection on the mounting shell, which resiliently deformable projection also defines a radial recess within the mounting shell; and a projection formed on the retaining ring, which projection is inserted into the radial recess to fix the retaining ring within the mounting shell.

It will be appreciated that in this embodiment of the invention the mounting shell is positioned between the supporting structure and the sites on the retaining ring at which the latter is fixed to the mounting shell. This arrangement ensures that when the conveyor ball unit is seated in the supporting structure, the supporting structure itself opposes movement of the retaining ring with respect to the mounting shell.

Alternatively, according to a second aspect of the present invention there is provided a conveyor ball unit comprising a conveyor ball; a mounting shell for the conveyor ball; a plurality of mounting balls for supporting the conveyor ball in the mounting shell; a retaining ring to keep the conveyor ball in position on the mounting balls within the mounting and a first locking element which is inserted into an opening defined by the mounting shell so that it partly projects beyond the outer surface defined by the mounting shell to attach the mounting shell to a supporting structure and to brace a rim of the mounting shell against the supporting structure, and which projects into a radial recess defined by the retaining ring to fix the retaining ring within the mounting shell.

This second embodiment achieves the same advantages as described above.

In both cases, the first locking elements are preferably shaped so that the mounting shell can be releasably snapped fitted into an opening defined by the supporting structure and held firmly, without need of any bolt or the like, and can be removed by releasing the snap engagement. Thus there is no need for an operator to acquire a particular skill demanded by a special-purpose bolt arrangement.

Preferably also, at least one second locking element is provided and forms part of the mounting shell on the other side of the conveyor ball diametrically opposite said first locking element. Thus, with only a slight modification that preserves the robustness of the unit, secure seating is ensured Preferably also, the shell rim defines a slot adjacent to the first locking element, into which slot a tool can be inserted to lever the conveyor ball unit out of the opening defined by the supporting structure. A suitable tool is the blade of a screwdriver and, as screwdrivers are always at hand, it is a very simple operation to remove the unit.

Preferably also, a pair of the first locking elements are provided and the slot is located between them. Thus the stability of the seating is increased and, owing to the symmetry, the process of levering the unit out is simplified.

Preferably also, the mounting shell is formed from a sheet material and defines a part-spherical portion in which the conveyor ball is mounted and a substantially horizontal portion running radially outwards from said part-spherical portion towards said rim of the mounting shell, said substantially horizontal portion being resiliently deformable so that said part-spherical portion can be moved with respect to said rim. This flexibility can be achieved by an appropriate choice of material and dimensions. It will also be appreciated that this feature of the invention ensures that the bearing is resilient to a certain degree, so that even hard impacts upon the conveyor ball do not irreversibly deform the mounting shell.

DESCRIPTION OF THE PREFERRED EMBODIMENTS

In the following description the same reference numbers are used for identical components or those with an identical purpose in the descriptions of both the first and the second embodiments.

Figure 1:
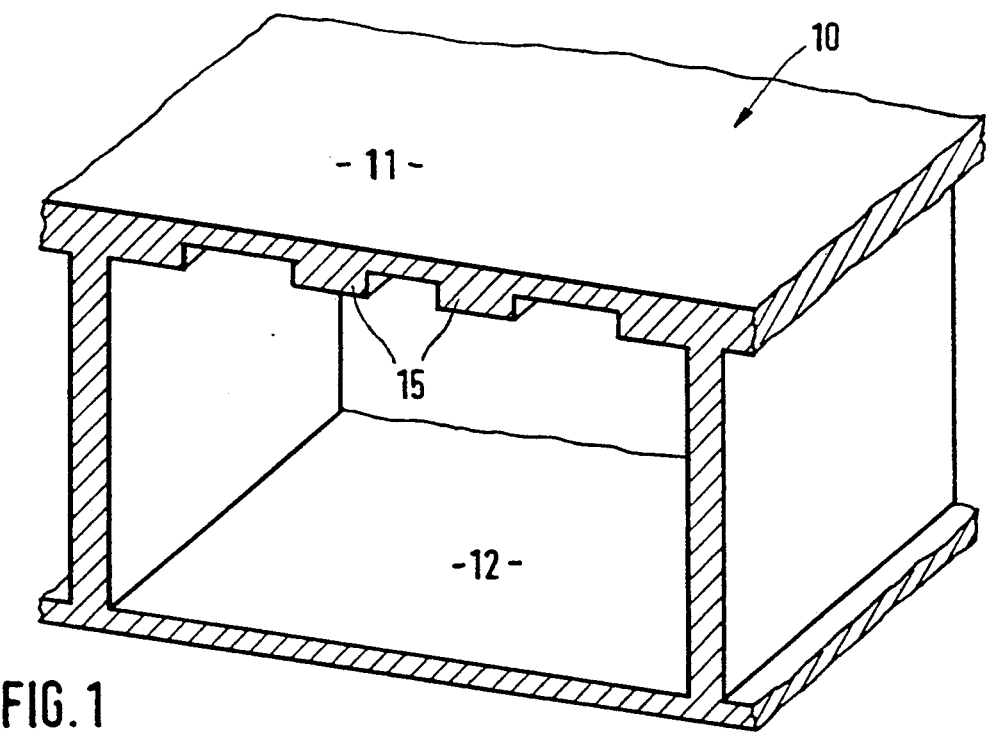
FIG. 1 is a perspective cross section view of a supporting structure for a conveyor ball unit according to present invention.
Figure 2:
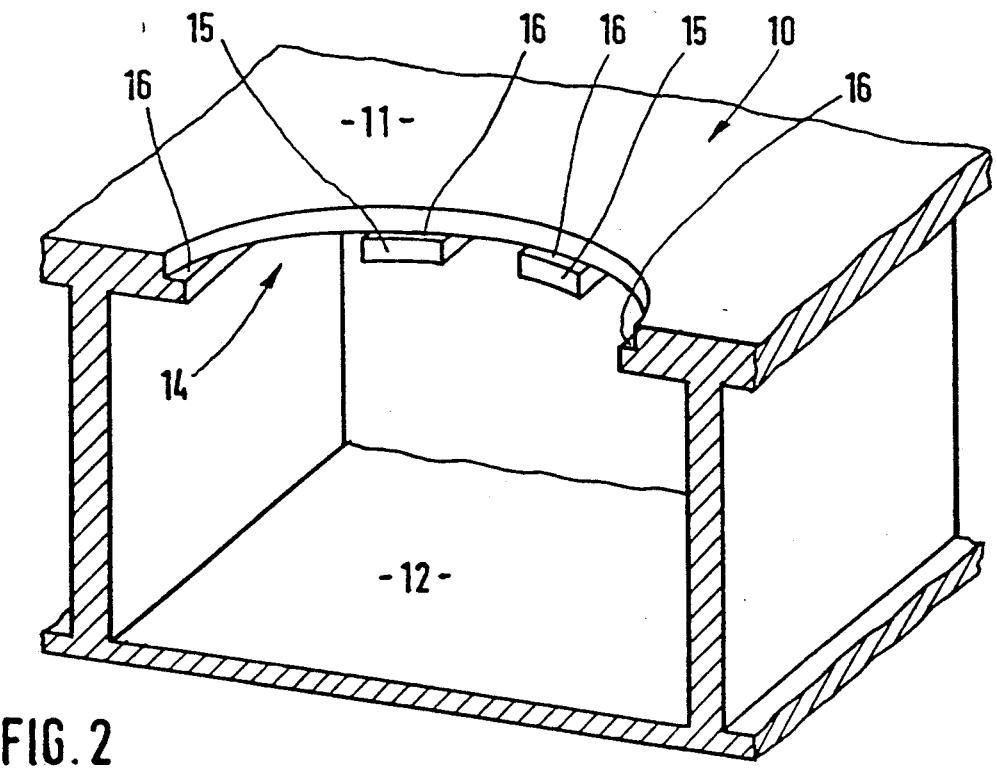
FIG. 2 is a view of the supporting structure as shown in FIG. 1 in which an opening has been made.

FIG. 1 is a perspective cross sectional view of a supporting structure 10 into which a conveyor ball unit according to the invention can be set. The supporting structure 10 can be manufactured as an extruded profile and comprises an upper surface 11 connected to a lower surface 12 by vertical members. The upper surface 11 has integral reinforcing ribs 15.

To enable a conveyor ball unit to be installed in the structure 10, a hole is first made in the upper surface 11. Then the circumference of the hole is milled, removing material of the upper surface 11 in such a way that the reinforcing ribs 15 project into the resulting opening 14 and form seating surfaces 16 on their upper sides.

A first embodiment of conveyor ball unit is shown in FIGS. 3 to 8. It comprises a conveyor ball 21 rotatably mounted in a mounting shell 23 by means of mounting balls 22. At its upper margin the mounting shell 23 projects to define a substantially horizontal annular portion 25 which is continuous with a vertical securing portion 35 and a substantially horizontal shell rim 30. The outside diameter of the horizontal shell rim 30 corresponds to the diameter of the milled-out region which, as previously described, encircles the hole drilled in the surface 11 of the supporting structure 10 to form the upper opening 14.

The conveyor ball 21 is held within the mounting shell 23 by a retaining ring 24. In the middle of the retaining ring 24 is a hole which, at least in its upper part, has a diameter less than that of the ball 21.

The retaining ring 24 consists of a resilient material, preferably of plastics, and has several projections 26, four in the embodiment illustrated here, with rounded contours. In regions corresponding to the positions of the projections 26 in the retaining ring 24, there are correspondingly shaped recesses in the interior of the mounting shell 23, which appear as rounded projections on the outer surface of the mounting shell 23. These projections constitute first locking elements 35. The mounting shell 23 is formed from a sheet of material of suitable thickness and elasticity, so that when a load is imposed on the conveyor ball 21 the horizontal portion 25 can yield in accordance with the load and thereby prevent transmission of very hard impacts from the conveyor ball 21 to the mounting shell 23 by way of the mounting balls 22. This elasticity also allows the locking elements 35 with the enclosed projections 26 to give way slightly in the radial direction.

Figure 3:
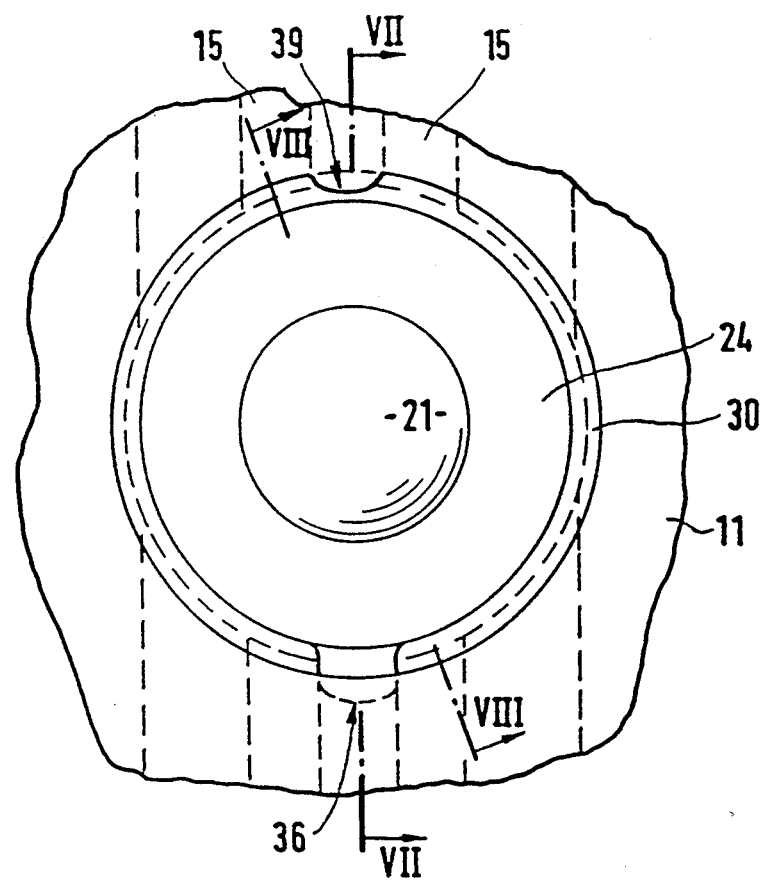
FIG. 3 is a plan view of a first embodiment of conveyor ball unit mounted in the supporting structure.
Figure 4:
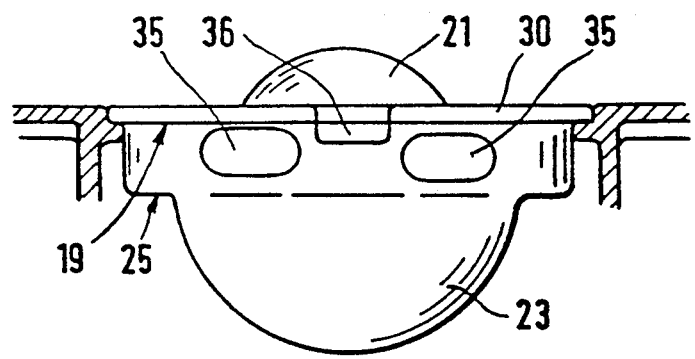
FIG. 4 is a side view of the conveyor ball unit shown in FIG. 3 in the direction of a locking element.
Figure 5:
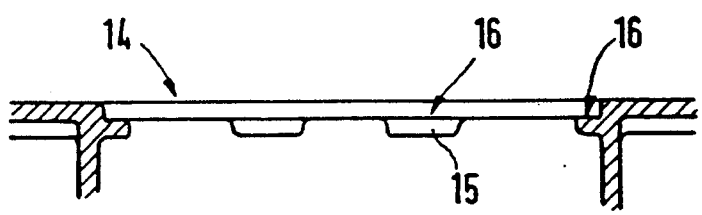
FIG. 5 is a cross sectional view of the supporting structure with the upper opening shown in FIG. 2.
Figure 6:
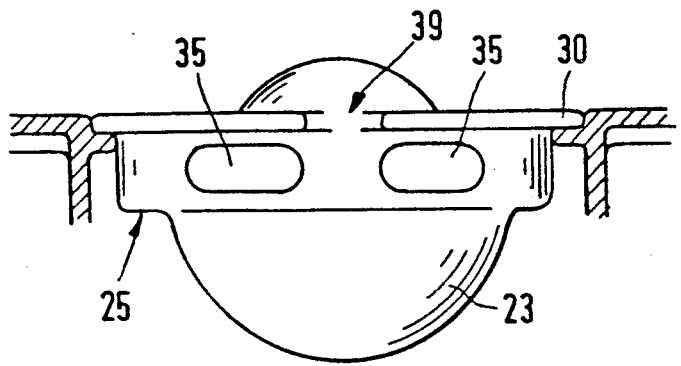
FIG. 6 is a side view of the conveyor ball unit shown in FIG. 3 showing the opening.
Figure 7:
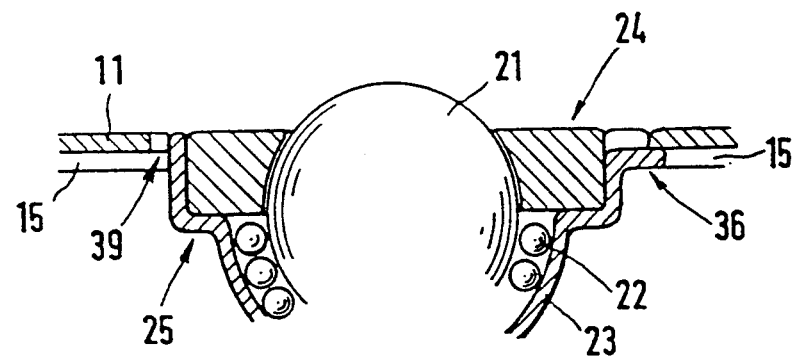
FIG. 7 is a partial sectional view along the line VII—VII in FIG. 3.
Figure 8:
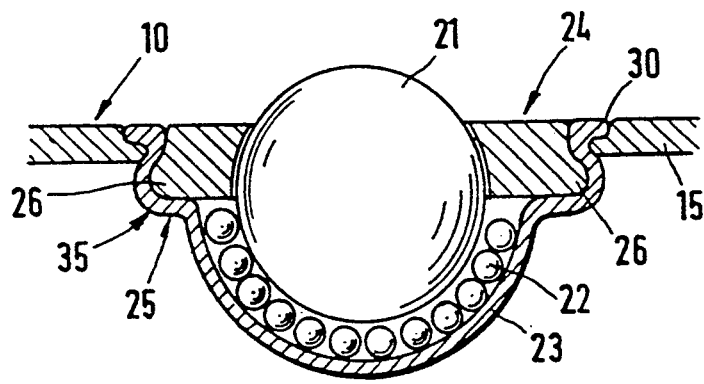
FIG. 8 is a partial sectional view along the line VIII—VIII in FIG. 3.
Figure 9:
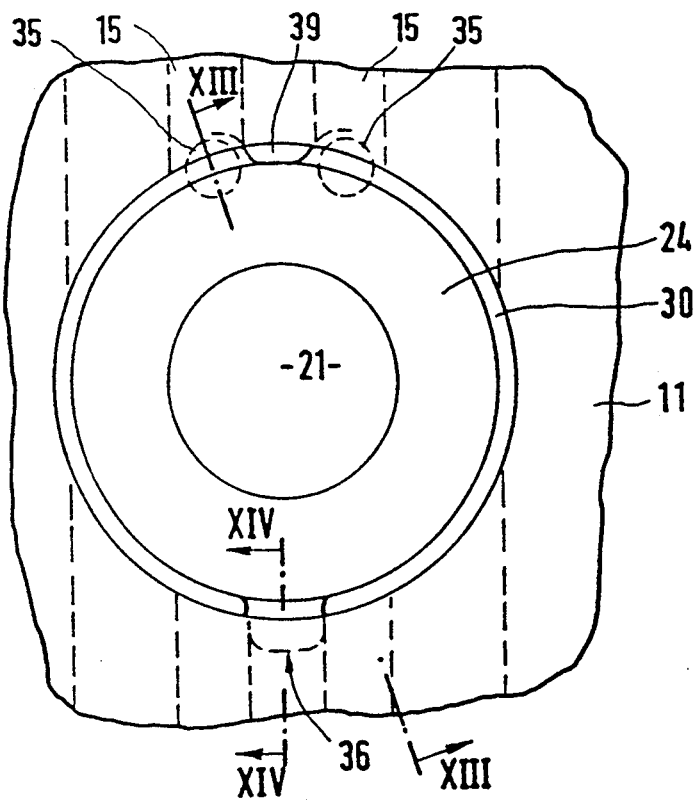
FIGS. 9 to 12 are views of a second embodiment of the invention, corresponding to the views of the first embodiment shown in FIGS. 3 to 6 respectively.
Figure 10:
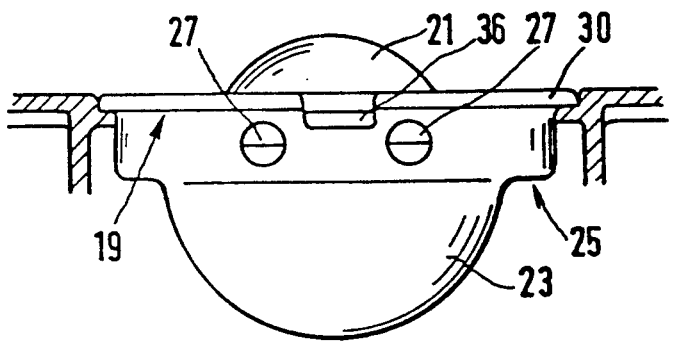
Figure 11:
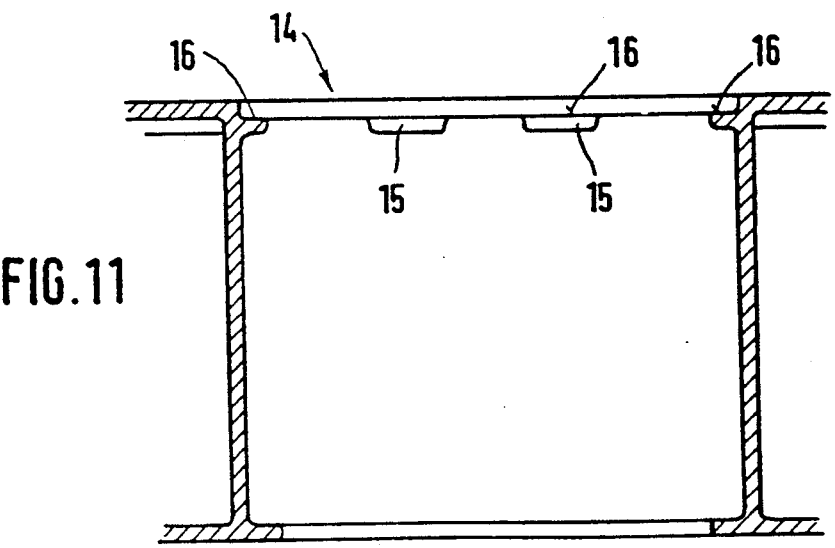
Figure 12:
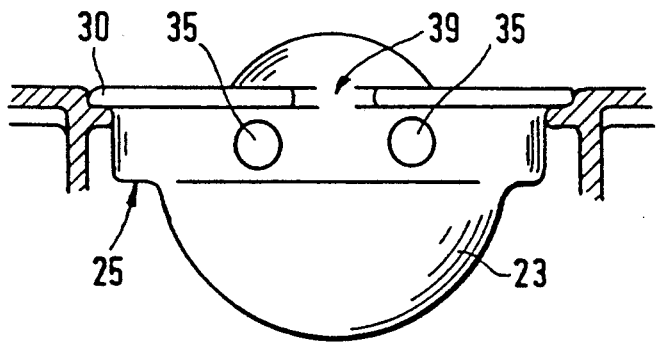
Figure 13:
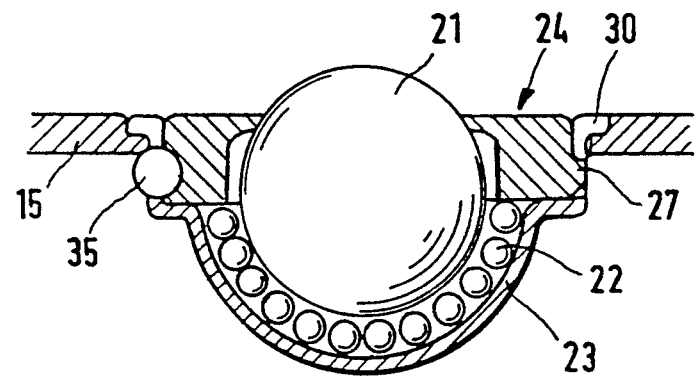
FIG. 13 is a sectional view along the line XIII—XIII in FIG. 9.
Figure 14:
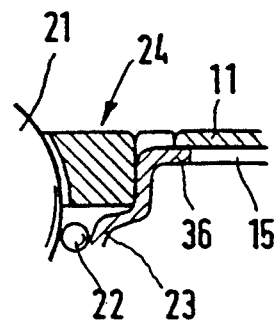
FIG. 14 is a sectional view along the line XIV—XIV in FIG. 9.

In a region between two reinforcing ribs 15, the shell rim 30 is indented, so that a tongue 36 is produced to form a second locking element. The shell rim 30 is here displaced downward by an amount such that the upper surface of the second locking element 36 lies at essentially the same height as the lower surface 19 of the rim 30, which rests on the seating surfaces 16. Furthermore, the tongue-shaped second locking element 36 projects radially beyond the outer edge of the shell rim 30. Thus when the conveyor ball unit has been installed, the tongue shaped second locking element 36 lies between two reinforcing ribs 15 and its end projects below the upper surface 11, as shown in FIG. 3.

Opposite to the locking element 36 in the shell rim 30, a slot 39 is provided. On either side of the slot 39 lies one of the first locking elements 35. Through this slot 39 a tool, such as the blade of a screwdriver, can be inserted in order to lever the mounting shell out of the supporting structure 10.

The procedure for setting the conveyor ball unit into the supporting structure is first to tilt the entire unit so that it can be lowered into the opening 14 with the second locking element 36 down and positioned between two reinforcing ribs 15. Then the shell rim 30, on the side of the conveyor ball unit opposite the second locking element 36, is pressed down. When strong pressure is applied or the shell rim 30 is struck lightly, the first locking elements 35 are deformed in such a way that they snap under the upper surface 11, so that the conveyor ball unit becomes firmly seated in the supporting structure 10.

The retaining ring 24 is now stably held on the mounting shell 23 because the recesses in which the projections 26 are seated are apposed to the edge of the upper opening 14 and hence have greater resistance to deformation.

To remove the conveyor ball unit from the supporting structure 10, the blade of a screwdriver can be inserted into the slot 39 so that the unit can be levered out of the opening 14.

The whole arrangement thus comprises only 4 parts. Assuming that the mounting balls 22 are considered as a single part, which are all of simple construction. Thus, both the disposition of the unit to wear and its price are thereby reduced.

The second embodiment shown in FIGS. 9 to 14 differs from the first embodiment shown in FIGS. 3 to 8 in the shape of the first locking elements 35. In the second embodiment, holes are drilled in part of the mounting shell 23 between the horizontal portion 25 and the shell rim 30. In the region of these holes, the retaining ring 24 is provided with tabs or hooks 27 on one side and with indentations on the other side. The indentations are shaped in such a way that spherical locking pieces 35 can be inserted to serve as first locking elements 35, so that each sphere protrudes for some distance radially out of the hole in the mounting shell 23, while its other side is seated in the associated indentation in the retaining ring 24. The retaining ring 24 is thus securely held within the mounting shell 23.

To set the conveyor ball unit into a supporting structure 10, one proceeds as described for the first embodiment. That is, first the conveyor ball unit is tilted and placed in the opening with its tongue-shaped second locking element 36 between two reinforcing ribs 15. Then the conveyor ball unit is tilted back until the spherical first locking element 35 is seated on the seating surface 16. Under further pressure or a light tap on the shell rim 30, the spherical first locking element 35 is pushed inward, owing to elastic deformation of the retaining ring 24 in this area, and snaps under the lower surface of the reinforcing rib 15. In this state, the conveyor ball unit is securely held within the supporting structure 10. The retaining ring 24 is also firmly held when the conveyor ball unit is in this position because when the spherical locking element 35 has been snapped into place under the reinforcing rib 15 it is pressed tightly against the retaining ring 24.

This conveyor ball unit is also of simple construction and comprises a small number of economically produced parts. Because the processes of insertion into and removal from the supporting structure 10 are the same as for the first embodiment described previously, the second embodiment has the same advantages.

In the first embodiment described with reference to FIGS. 3 to 8, two pairs of first locking elements 35 and two pairs of projections 26 are shown. It is of course possible to use any number of elements 35 and projections 26 but it is advantageous for the unit to be symmetrical, especially with respect to the slot 39 and relative to the second locking element 36. The same also applies to the second embodiment as described with reference to FIGS. 9 to 14.

What is claimed is:

1. A conveyor ball unit comprising
   a conveyor ball;
   a mounting shell for the conveyor ball;
   a plurality of mounting balls for supporting the conveyor ball in the mounting shell;
   a retaining ring to keep the conveyor ball in position on the mounting balls within the mounting shell; and
   a first locking element which is inverted into an opening defined by the mounting shell so that it partly projects beyond the outer surface defined by the mounting shell to attach the mounting shell to a supporting structure and to brace a rim of the mounting shell against the supporting structure, and which projects into a radial recess defined by the retaining ring to fix the retaining ring within the mounting shell.

2. A conveyor ball unit as claimed in claim 1, wherein the first locking element has a spherical shape.

3. A conveyor ball unit as claimed in claim 1, wherein the first locking element can be releasably snapped fitted into an opening defined by the supporting structure.

4. A conveyor ball unit claimed in claim 3 wherein the shell rim defines a slot adjacent to the first locking element, into which slot a tool can be inserted to lever the conveyor ball unit out of the opening defined by the supporting structure.

5. A conveyor ball unit as claimed in claim 4, wherein a pair of the first locking elements are provided and said slot is located between them.

6. A conveyor ball unit as claimed in claim 1, wherein at least one second locking element is provided and forms part of the mounting shell on the other side of the conveyor ball diametrically opposite said first locking element.

7. A conveyor ball unit as claimed in claim 1, wherein the mounting shell is formed from a sheet material and defines a part-spherical portion in which the conveyor ball is mounted and a substantially horizontal portion running radially outwards from said part-spherical portion towards said rim of the mounting shell, said substantially horizontal portion being resiliently deformable so that said part-spherical portion can be moved with respect to said rim.

* * * * *